United States Patent [19]
Chouings

[11] 3,794,076
[45] Feb. 26, 1974

[54] VALVE DEVICES
[75] Inventor: Leslie Cyril Chouings, Leamington Spa, England
[73] Assignee: Automotive Products Company Limited, Leamington Spa, England
[22] Filed: July 28, 1971
[21] Appl. No.: 166,662

[30] Foreign Application Priority Data
Aug. 10, 1970   Great Britain.................. 38,478/70

[52] U.S. Cl. .................................. 137/115, 303/10
[51] Int. Cl. ......................................... G05d 11/00
[58] Field of Search..................... 137/115, 116, 118

[56] References Cited
UNITED STATES PATENTS

| | | | |
|---|---|---|---|
| 2,395,941 | 3/1946 | Rockwell | 137/115 X |
| 1,731,145 | 10/1929 | MacMillin | 137/116 |
| 2,429,489 | 10/1947 | Roth | 137/116 |
| 2,591,806 | 4/1952 | Graham | 137/116 |
| 2,919,162 | 12/1959 | Roberts | 137/115 X |
| 3,457,941 | 7/1969 | Cook | 137/116 |

FOREIGN PATENTS OR APPLICATIONS
918,614   2/1963   Great Britain..................... 137/116

*Primary Examiner*—William R. Cline

[57]   ABSTRACT

A valve device for controlling the supply of liquid pressure from a pump to two liquid pressure accumulators in a dual line liquid pressure braking system for a vehicle has an inlet port, two outlet ports and a vent port. The inlet port communicates with each outlet port via a respective non-return valve. Communication between the inlet port and the vent port is controlled by a normally closed valve which may be opened by means responsive directly or indirectly to the pressure at the outlet ports. The pressure responsive means responsive directly to the pressure at the outlet ports may comprise two pistons acting through a common beam which is hinged centrally to a plunger, movement of the plunger being arranged to open the normally closed valve. The valve device may include two fluid pressure responsive electric switches which are responsive to the pressure at a respective one of the outlet ports and which are arranged to operate a warning device.

6 Claims, 5 Drawing Figures

VALVE DEVICES

This invention relates to valve devices for connecting fluid pressure generating devices to fluid pressure storage devices.

It is an object of this invention to provide a new and improved valve device for the purpose specified.

According to this invention there is provided a valve device for connecting a fluid pressure generating device to two fluid pressure storage devices, comprising a valve body having two outlet ports interconnected by a bore in the valve body, each outlet port being for connection to a respective one of the two fluid pressure storage devices, an inlet port for connection to said fluid pressure generating device, inlet conduit means opening at one end into a portion of said bore between said two outlet ports and at the other end into said inlet port, non-return valve means to prevent the backflow of liquid from each outlet port to said inlet conduit means, a vent port, normally closed valve means controlling communication between said vent port and said inlet port, and fluid pressure responsive means arranged to open said normally closed valve means and place said inlet port in communication with said vent port when the fluid pressure at said two outlet ports reaches a predetermined maximum value so that further fluid is not fed through said non-return valve means to said outlet ports from said inlet port.

The normally closed valve means may comprise a ball spring loaded onto a valve seating defined at one end of a cylindrical bore with which the vent port is in communication, the pressure responsive means comprising a plunger located slidably within the cylinderical bore, the plunger carrying an axially extending probe which projects towards the ball and is arranged to engage the ball and move the ball off its valve seating in order to place the inlet port in communication with the vent port. The plunger may be reponsive to the fluid pressure at each outlet port in which case the fluid pressure at each outlet port may be transmitted to said plunger through a respective piston. Conveniently the two pistons are disposed on opposite sides of the axis of the plunger and arranged to engage a beam which is hinged to the plunger so that the plunger can be moved by one only of the two pistons, and by movement of both pistons.

There may be two fluid pressure responsive control means arranged to operate a respective one of two warning devices, each fluid pressure responsive control means being subjected to the fluid pressure at a respective one of the two outlet ports. Where the fluid pressure responsive means comprises a plunger responsive to fluid pressure at each outlet port, the fluid pressure at each outlet port being transmitted to the plunger through a respective piston, each fluid pressure responsive control means may comprise a plunger slidable in a cylinder space which is in communication with the respective outlet port via a cylindrical cavity, the piston associated with the same outlet port being slidable within a cylinder space which also is in communication with the said respective outlet port via said cylindrical cavity.

One embodiments of this invention will be described now by way of example only with reference to the accompanying drawings, of which :

Figure 1:
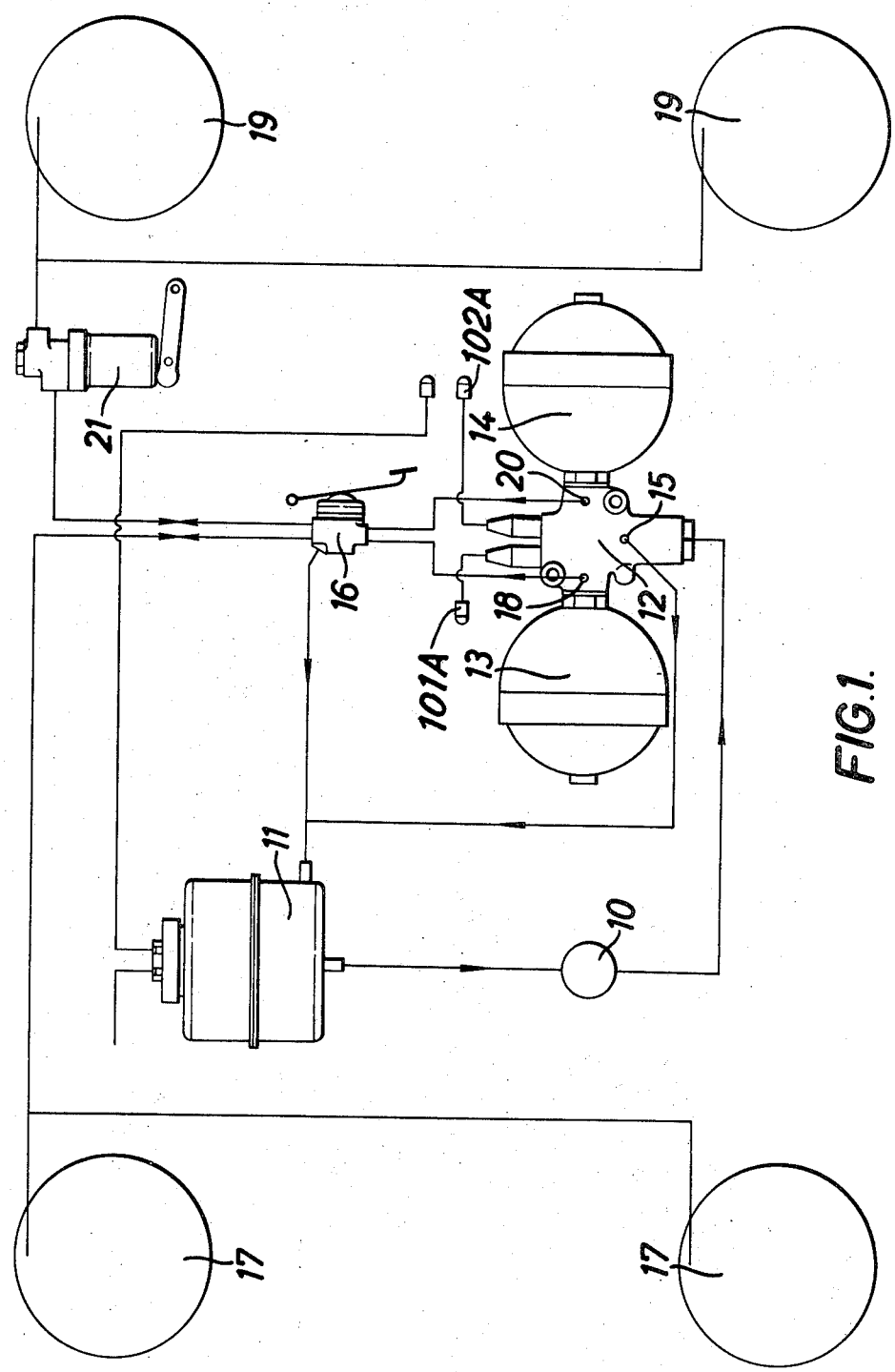
FIG. 1 is a diagrammtic illustration of a dual line braking system incorporating a valve device according to this invention.

Referring to FIG. 1, a dual line braking system for a vehicle includes a pump 10 which is arranged to be driven continuously by an engine of the vehicle. The pump 10 draws liquid from a liquid reservoir 11 and feeds it under pressure to a valve device 12. The valve device 12, two practical forms of which will be described below, is arranged to control the supply of liquid under pressure to each of two liquid pressure accumulators 13 and 14, and, when pressure in the two accumulators is at a predetermined level, to direct liquid under pressure received from the pump 10 to the liquid reservoir 11 via a vent port 15.

A common pedal operated brake application control valve 16 controls the connection of the accumulator 13 to brake applying motor cylinders on the front wheels 17 of the vehicle via a port 18 in the valve device 12, and the connection of the accumulator 14 to brake applying motor cylinders on the rear wheels 19 of the vehicle via a port 20 in the valve device 12. A pressure reducing valve 21, connected between the control valve 16 and the motor cylinders on the rear wheels 19, is associated with the suspension system of the vehicle so that the pressure of liquid acting in the motor cylinders of the rear wheels 19 is controlled in accordance with the loading of the vehicle.

One embodiment of valve device 12 will be described now with reference to FIGS. 2, 3 and 4.

The valve device comprises a body 68 formed with a cylindrical cavity 69 which opens at one end of the body 68 and which has a coaxial cylindrical bore 70 extending from its other end to a transverse cavity 71 which is rectangular in cross-section. The diameter of the cylindrical cavity 69 is greater than the diameter of the coaxial cylindrical bore 70. A valve seat 72 is provided around the end of the coaxial cylindrical bore 70 which opens into the cylindrical cavity 69. A plug 73 is screwed into the open end of the cavity 69 so as to define a space within the cavity 69 between itself and said other end of the cavity 69.

A stepped cylindrical member 74 is located slidably within the cylindrical cavity 69, the smaller diameter portion of the stepped cylindrical member 74 being positioned on the side thereof nearer to the plug 73. The stepped cylindrical member 74 is provided with a coaxial passage 75 which opens into a hemispherical depression 76 formed in the end of the stepped cylindrical member 74 remote from the plug 73. The hemispherical depression 76 is adapted to receive a ball 77 and the stepped cylindrical member 74 is urged towards the valve seat 72 by a spiral spring 78 which takes its abutment from the plug 73, so as to hold the ball 77 in engagement with the valve seat 72.

A plunger 79 is mounted slidably in the coaxial cylindrical bore 70 and has an integral axially projecting pin 80 of reduced diameter which is arranged to engage the ball 77.

The vent port 15 (not shown) is in communication with a part of the coaxial cylindrical bore 70 between the valve seat 72 and the larger diameter part of the plunger 79.

A conduit 81 in the valve body 68 (see FIG. 3) places the inlet port 82 in communication with the part of the cylindrical cavity 69 defined between the stepped cylindrical member 74 and the said other end of the cylindrical cavity 69.

A transverse cylindrical through bore is formed in the valve body 68. The through bore is stepped, comprising a central smaller diameter bore portion 83A between two outer larger diameter bore portions 83B (see FIG. 4). The central smaller diameter bore portion 83A is in communication with the conduit 81 between the inlet port 82 and the cylindrical cavity 69 (see FIG. 3).

Figure 4:
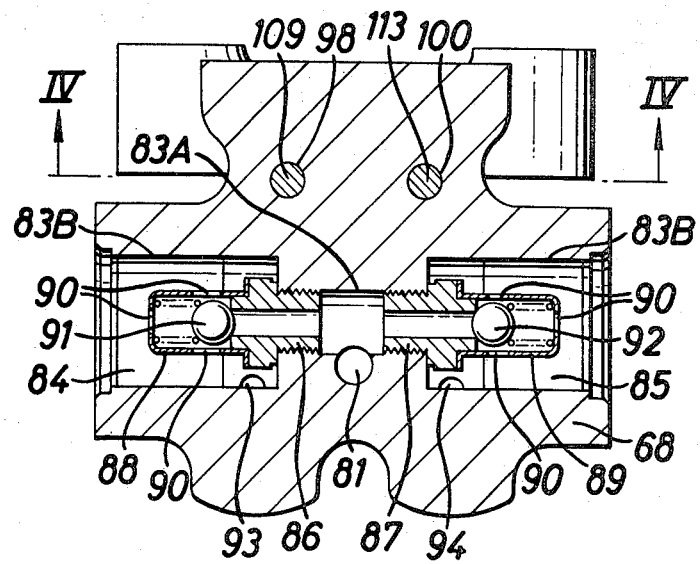
FIG. 4 is a section on the line VI — VI of FIG. 2.

Referring to FIG. 4, the open ends of the two outer larger diameter bore portions 83B constitute outlet ports 84 and 85 by which the through bore is connected to the two liquid pressure accumulators 13 and 14. An annular valve seat 86 is screwed into the end of the central smaller diameter bore portion 83A nearer the outlet port 84, and another annular valve seat 87 is screwed into the other end of the central smaller diameter bore portion 83A. The annular valve seat 86 has a cup shaped member 88 mounted thereon within the respective larger diameter bore portion 83B and the annular valve seat 87 has a similar cup shaped member 89 mounted thereon within the other larger diameter bore portion 83B. The two cup shaped members 88 and 89 are apertured at 90. A ball 91 within the cup shaped member 88 is spring loaded into engagement with the annular valve seat 86 and a ball 92 in the cup shaped member 89 is spring loaded into engagement with the annular valve seat 87. The two balls 91 and 92 function as non-return valve members. A port 93 is formed in the cylindrical side wall of the larger diameter bore portion 83B which defines the port 84, and a port 94 is defined in the cylindrical side wall of the larger diameter ball portion 83B which defines the port 85.

Referring again to FIG. 2, two cylindrical cavities 95 and 96 are formed in the body 68 so as to open into the end thereof remote from the cylindrical cavity 69. The axes of the cylindrical cavities 69, 95 and 96 are parallel. A stepped cylindrical bore connects the cavity 95 to the transverse cavity 71 and comprises a larger diameter bore portion 97 which opens into the end of the cylindrical cavity 95 nearer the cylindrical cavity 69, and a smaller diameter bore portion 98 which opens into the transverse cavity 71. Another stepped cylindrical bore connects the cavity 96 to the transverse cavity 71 and comprises a larger diameter bore portion 99 which opens into the end of the cylindrical cavity 96 nearer the cylindrical cavity 69, and a smaller diameter bore portion 100 which opens into the transverse cavity 71. The axes of the two stepped cylindrical bores are parallel and each said axis is offset from the axis of the respective cavity 95 or 96 so that the axes of the two stepping cylindrical bores are between the axes of the two cavities 95 and 96.

A respective one of two switch bodies 101 and 102 is screwed into each of the recesses 95 and 96. A cylindrical cavity 103 opens into the end of the switch body 101 which abuts the end of the cavity 95 nearer the cavity 69. A smaller diameter coaxial bore 104 opens into the closed end of the cavity 103. A cylindrical cavity 105 opens into the end of the switch housing 102 which abuts the end of the cavity 106 nearer the cavity 69. A smaller diameter coaxial bore 106 opens into the closed end of the cavity 105.

The remainder of each of the switch bodies 101 and 102 comprises fluid pressure responsive electric control means for a respective warning device 101A, 102A (see FIG. 1).

An annular packing ring 107 is located in abutment with the shoulder between the two bore portions 97 and 98 by a cup-shaped cylindrical insert 108 which is trapped within the larger diameter bore portion 97 by the switch body 101. The internal diameter of both the packing ring 107 and the cup-shaped cylindrical insert 108 is equal to that of the smaller diameter bore portion 98. A piston 109 is located slidably within the cylindrical space defined by the smaller diameter bore portion 98, the packing ring 107 and the recess of the cup-shaped cylindrical insert 108. An aperture 110 in the base of the cup-shaped cylindrical insert 108 places the recess therein in communication with the cylindrical cavity 103.

An annular packing ring 111 is located in abutment with the shoulder between the two bore portions 99 and 100 by a cup-shaped cylindrical insert 112 which is trapped within the larger diameter bore portion 99 by the switch body 102. The internal diameter of both the packing ring 111 and the cup-shaped cylindrical insert 112 is equal to the diameter of the smaller diameter bore portion 100. A piston 113 is located slidably within the cylindrical space defined by the smaller diameter bore portion 100, the packing ring 111 and the recess of the cup-shaped cylindrical insert 112. An aperture 114 in the base of the cup-shaped cylindrical insert 112 places the recess therein in communication with the cylindrical cavity 105.

A beam 115 is located in the transverse cavity 71 and is hinged at its centre to the plunger 79. The pistons 109 and 113 engage the surface of the beam 115 on the opposite side thereof from the plunger 79, and are disposed symmetrically on opposite sides of the axes of the plunger 79. A ball bearing 116 is housed in a cavity 117 in the wall of the transverse cavity 71 opposite to the smaller diameter bore portion 98 so that the axis of the piston 109 passes through the centre of the ball bearing 116. A ball bearing 118 is housed in a cavity 119 in the wall of the transverse cavity 71 opposite to the smaller diameter bore portion 100 so that the axis of the piston 113 passes through the centre of the ball bearing 118.

The port 93 in the wall of the larger diameter bore portion 83B which defines the port 84 is in conduit communication with the cylindrical cavity 103 and with the port 18. The port 94 in the other larger diameter bore portion 83B is in conduit communication with the cylindrical cavity 105 and the port 20. The ports 18 and 20 are not shown in FIGS. 2, 3 or 4.

Figure 5:
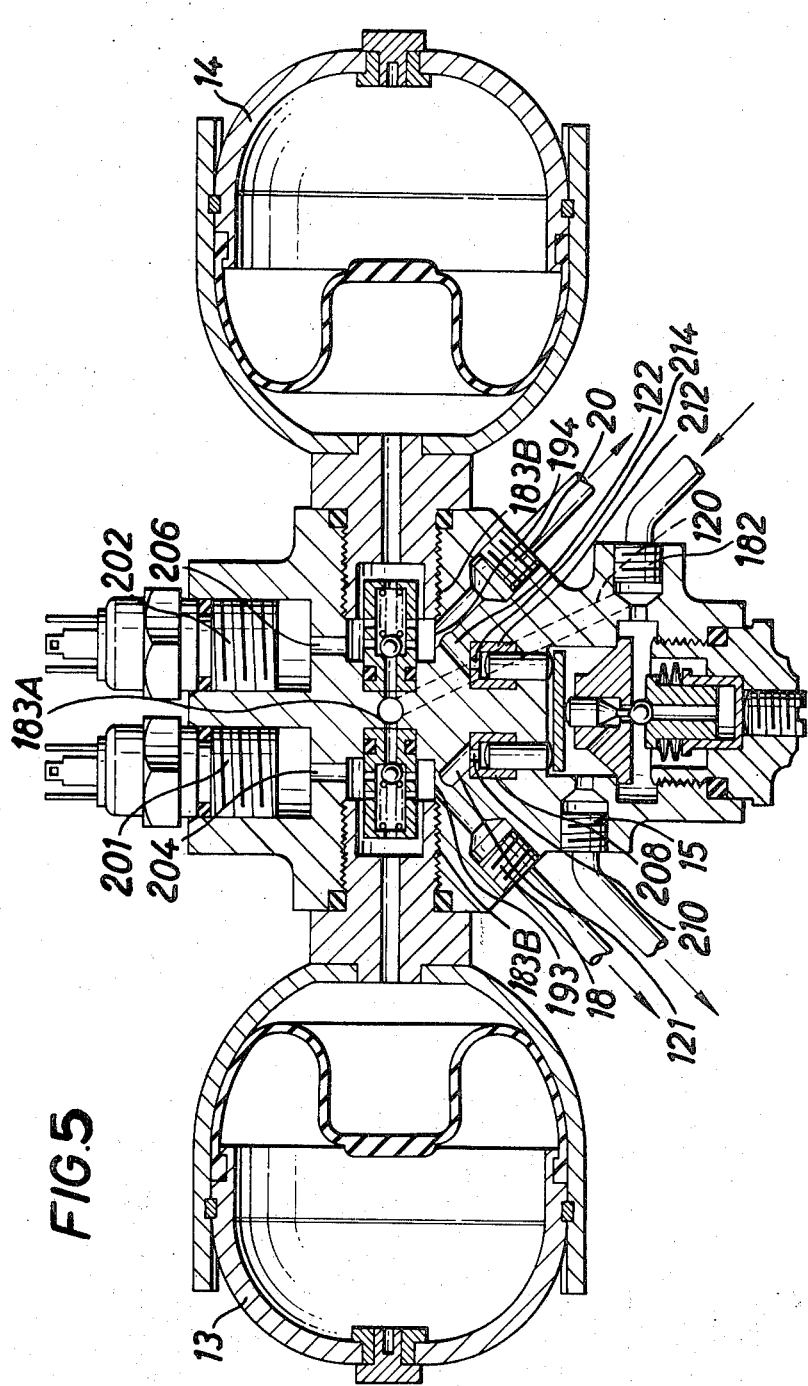
FIG. 5 is a diagrammatic representation in section of a valve device simlar to that of FIGS. 2 to 4, together with the associated accumulators.

Referring now to FIG. 5, there is illustrated a valve device similar in its construction and manner of operation to the valve device described with reference to FIGS. 2, 3 and 4. Like the valve device described above with reference to FIGS. 2, 3 and 4, the valve device illustrated in FIG. 5 has an inlet port 182, a transvere through bore which inclues a smaller diameter central bore portion 183A between two larger diameter end bore portions 183B, a pair of cylindrical inserts 208 and 212 which correspond to the cylindrical inserts 108 and 112 and which each have a respective aperture 210, 214 that is in communication with the respective end bore portion 183B via a respective one of the ports 193 and 194 and a pair of switch bodies 201 and 202 which correspond to the switch bodies 101 and 102. The features of the valve device illustrated in FIG. 5 which differ significantly from corresponding features of the valve device illustrated in FIGS. 2, 3 and 4, include the fact that the inlet port 182 communicates with the smaller diameter central bore portion 183A via a passage 120, that the switch bodies 201 and 202 do not include cylindrical cavities like the cylindrical cavities 103 and 105 of the switch bodies 101 and 102, that the apertures 210 and 214 are placed in direct conduit communication with the respective port 193 and 194 via a respective conduit 121 and 122, and that the pressure in each larger diameter end bore portion 183B is applied to the fluid pressure responsive electric switch control means part of the respective switch body 201 and 202 via a respective bore 204 or 206 in the valve body.

Figure 2:
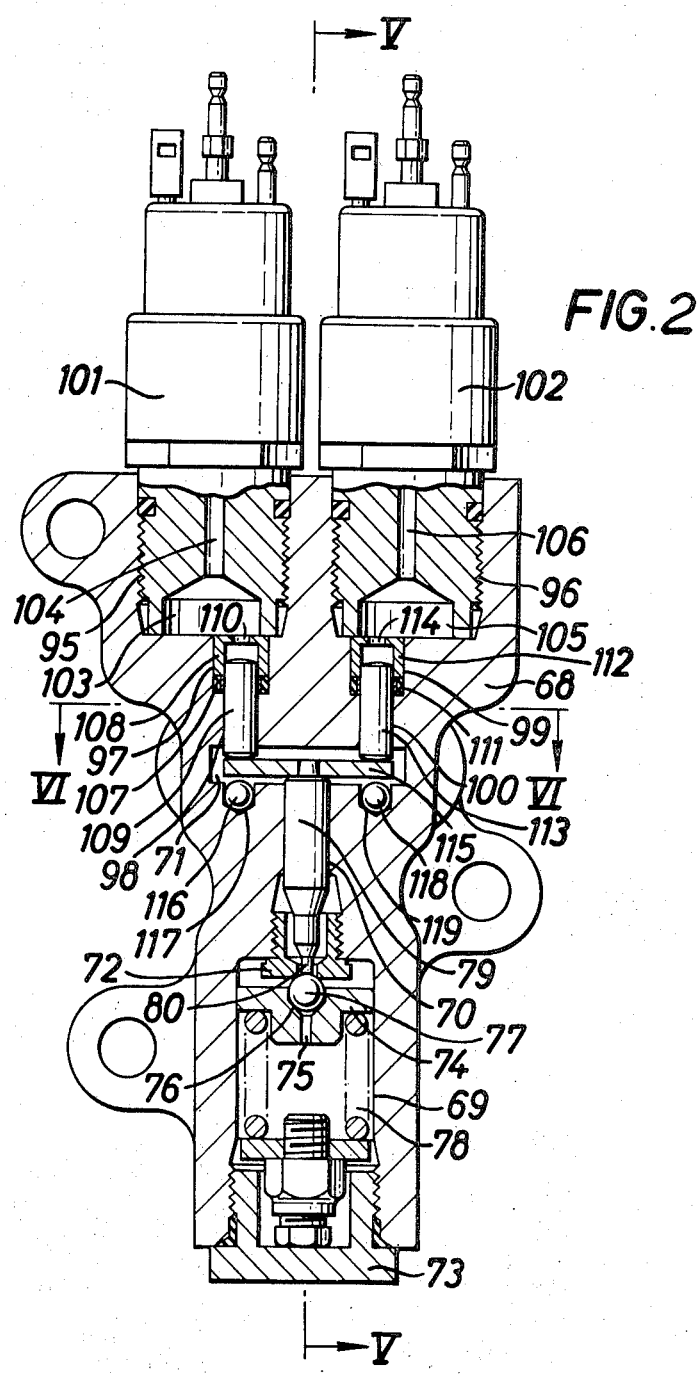
FIG. 2 is a partly sectioned elevation of a valve device according to this invention, drawn to a larger scale than FIG. 1, and sectioned on the line IV —IV of FIG. 4.
Figure 3:
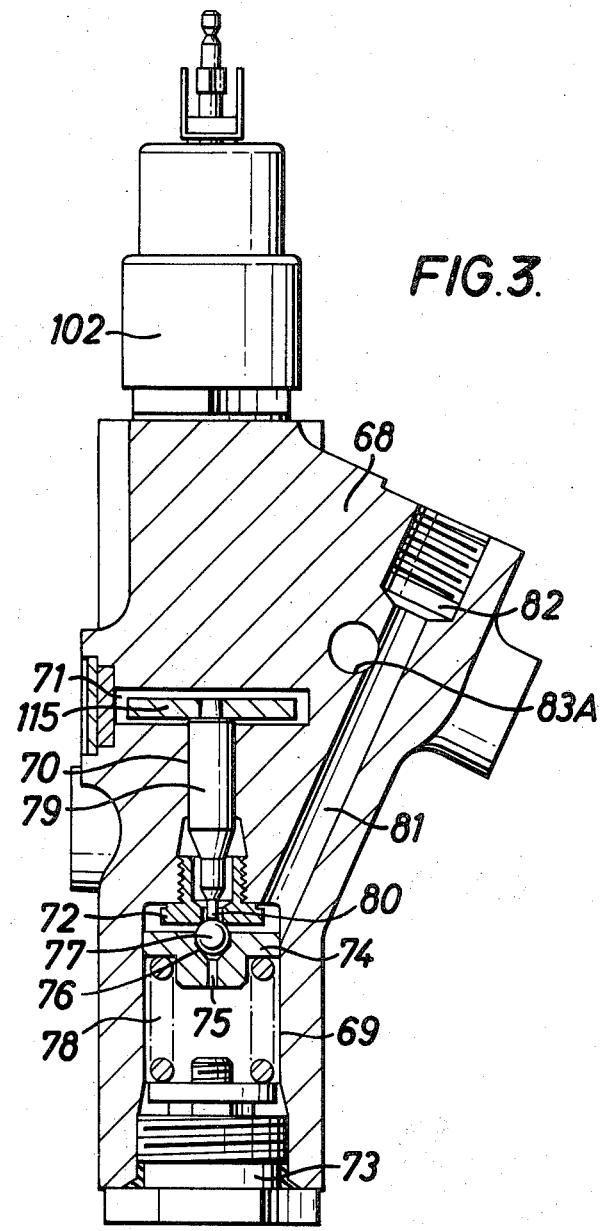
FIG. 3 is a section on the line V — V of FIG. 2.

In operation of the valve devices illustrated in FIGS. 2, 3 and 4 or in FIG. 5, liquid delivered by the pump 10 is fed into the valve device through the inlet port 82, such liquid flowing through the passage 81 into the space defined within the cylindrical cavity 69 on the opposite side of the stepped cylindrical member 74 from the plug 73, and entering the smaller diameter central bore portion 83B of the transverse through bore to be forced passed the non-return valve members 91 and 92 into the respective liquid pressure accumulators 13 or 14. Liquid under pressure is fed from the accumulators 13 and 14 via the respective port 93 or 94 and outlet port 18 or 20 to the common pedal operated brake application control valve 16.

Liquid pressure within each accumulator 13 or 14 also is applied to the respective piston 109 or 113, and, when the pressure reaches a predetermined value, which is determined by the rating of the spring 78, the spring 78 yields and the plunger 79 is moved by the two pistons 109 and 113 which act through the beam 115. Such movement of the plunger 79 displaces the ball 77 from the valve seat 72 so as to connect the inlet port 82 directly to the vent port 15. When the inlet port 82 is connected to the vent port 15 the non-return valve members 91 and 92 seat on the respective valve seats 86 and 87 under the action of the spring loading so that further liquid under pressure is not supplied to the respective accumulators 13 or 14.

If a leak develops in either one of the liquid pressure accumulators 13 or 14, or in any part of the system supplied with liquid under pressure by the accumulators 13 and 14, so that there is a drop in the liquid pressure at one only of the two outlet ports 84 or 85, liquid under pressure still is supplied through the other outlet port 84 or 85 to the respective accumulator 13 or 14. When the pressure of liquid in that accumulator 13 or 14 reaches the predetermined value the action of liquid under pressure on the respective piston 109 or 113 acts through the rocking beam 115 to move the plunger 79 and displace the ball 74 from the seat 72.

Various modifications or improvements of the valve devices described above may be incorporated without departing from the scope of this invention. It will be understood that the valve device 12 may be incorporated in a compressed air braking system, the pump 10 being replaced by an air compressor and the liquid pressure accumulators 13 and 14 by compressed air reservoirs. Alternatively a valve device in accordance with this invention may be incorporated in any other fluid pressure control system having a fluid pressure generating device which is to be connected to one or two fluid pressure storage devices.

I claim:

1. A valve device for connecting a fluid pressure generating device to two fluid pressure devices, comprising a valve body having two outlet ports interconnected by a bore in the valve body, each outlet port being for connection to a respective one of the two fluid pressure storage devices, an inlet port for connection to said fluid pressure generating device, inlet conduit means opening at one end into a portion of said bore between said two outlet ports and at the other end into said inlet port, and non-return valve means to prevent the backflow of liquid from each outlet port to said inlet conduit means, wherein the improvement comprises:
   i. a vent port;
   ii. normally closed valve means controlling communication between said vent port and said inlet port; and
   iii. fluid pressure responsive means arranged to open said normally closed valve means and place said inlet port in communication with said vent port when the fluid pressure at said two outlet ports reaches a predetermined maximum value so that further fluid is not fed through the non-return valve means to said outlet ports from said inlet port.

2. A valve device according to claim 1, wherein the improvement further comprises:
   i. said normally closed valve means comprising a ball spring loaded onto a valve seating defined at one end of a cylindrical bore with which the vent port is in communication;
   ii. the fluid pressure responsive means comprising a plunger located slidably within the cylindrical bore, the plunger carrying an axially extending probe which projects towards the ball and is arranged to engage the ball and move the ball off its valve seating in order to place the inlet port in communication with the vent port; and
   iii. the plunger being responsive to the fluid pressure at each outlet port.

3. A valve device according to claim 2, the improvement further comprises:
   i. two pistons;
   ii. means by which movement of each piston is transmitted to the plunger; and
   iii. means by which the fluid pressure at each outlet port is applied to a respective one of said pistons so that the fluid pressure at each outlet port is transmitted to the plunger through a respective one of the pistons.

4. A valve device according to claim 3, wherein the improvement further comprises the two pistons being disposed symmetrically on opposite sides of the axis of the plunger.

5. A valve device according to claim 4, wherein the improvement further comprises a beam hinged to the plunger and engaged by the two pistons so that the plunger can be moved by movement of one only of the two pistons and by movement of both pistons.

6. A valve device according to claim 1, wherein the improvement further comprises:
   i. two fluid pressure responsive control means arranged to operate a respective one of two warning devices; and
   ii. means by which each fluid pressure responsive control means is subjected to the fluid pressure at a respective one of the two outlet ports.

* * * * *